No. 787,973. Patented April 25, 1905.

UNITED STATES PATENT OFFICE.

CHARLES HENRY BURCKETT AND MARY MARTIN BURCKETT, OF GLEN-RIDGE, NEW JERSEY; SAID CHARLES HENRY BURCKETT ASSIGNOR TO SAID MARY MARTIN BURCKETT.

COCOA CONFECTION AND PROCESS OF MAKING SAME.

SPECIFICATION forming part of Letters Patent No. 787,973, dated April 25, 1905.

Application filed September 2, 1902. Serial No. 121,871.

*To all whom it may concern:*

Be it known that we, CHARLES HENRY BURCKETT and MARY MARTIN BURCKETT, citizens of the United States, and residents of Glenridge, in the county of Essex and State of New Jersey, have jointly invented a certain new and useful Improvement in Cocoa Confections and Processes of Making the Same, of which the following is a specification.

This invention relates to cocoa confections, and comprises the product as well as the process of producing a confection from cocoa-beans, in which the starch of the beans is converted into malt sugar, maltose, dextrine, &c., the butter thereof emulsified, and the compound mixed with a diastatic ferment and, if required, with a flavoring agent.

To produce what we will herein term a "partially-predigested cocoa confection," we combine the following ingredients in about the proportions stated—viz., cocoa-beans, one hundred pounds; water, two hundred pounds; malt extract, fifty pounds.

The successive steps and proportionate quantities of the ingredients by which the process is carried out and the product formed are, first, to roast one hundred pounds of cocoa-beans, then crush them and fan out or otherwise remove the shells, grind and heat or boil the beans with two hundred pounds of water for about five hours or until all the starch-grains are broken, when there is added a starch-converting ferment, preferably fifty pounds of malt extract, and the mixture digested at 170° Fahrenheit for about five hours or until all the starch is converted into malt sugar, maltose, dextrine, &c. The mixture is then evaporated and rapidly stirred, when the butter of the cocoa will become emulsified throughout the compound, the said compound being devoid of starch and constituting a partially-predigested cocoa confection.

The malt extract referred to is preferably prepared by grinding seventy-five pounds of malt and sprinkling it with a mixture of one-half pound of lime dissolved in ten pounds of water to neutralize the acidity of the hulls. Then one hundred and forty pounds of water are added and the mixture digested in a vessel for about two hours at 170° Fahrenheit. The malt mixture is then generally filtered through a filter-press and the liquor obtained evaporated until reduced to fifty pounds in weight.

To obtain a partially-predigested and digestive cocoa, we carry out the steps and combine the ingredients, as hereinabove described, for a partially-predigested cocoa confection and add to the mixture obtained a diastatic ferment, preferably twenty-five pounds of malt extract, and evaporate at 170° Fahrenheit to the requisite consistency, stirring the same during the evaporation, thereby obtaining a compound with a free diastatic ferment.

To produce a sweet predigested and digestive cocoa, we follow the steps and combine the ingredients as described for the partially-predigested and digestive cocoa and when finally evaporating to the required consistency add about one hundred pounds of sugar.

Having described our invention, we claim—

1. A composition of matter containing cocoa-beans in which the starch has been converted into malt sugar, maltose and dextrine; water; sugar; and a free diastatic ferment.

2. The herein-described process of heating cocoa-beans with water, to break the starch-cells thereof; digesting with a starch-converting ferment until the starch is converted into malt sugar, maltose and dextrine; emulsifying the butter of the cocoa-bean throughout the mixture by evaporating and stirring.

3. The herein-described process of roasting cocoa-beans, removing the shells, grinding and heating with water until the starch-grains are broken, adding a starch-converting ferment, and digesting until the starch is converted into malt sugar, maltose, and dextrine, emulsifying the butter of the cocoa-bean with the other elements, by evaporating the mixture, and rapidly stirring.

4. The herein-described process of making a confection consisting in roasting cocoa-beans, removing the shells, grinding and boiling with water until the starch-grains are broken, next adding a starch-converting ferment and digesting until the starch is converted into malt sugar; maltose and dextrine, emulsifying the butter of the cocoa-beans with the other elements by evaporating and stirring the mixture, then adding a diastatic ferment, evaporating and again stirring to obtain a compound with a free diastatic ferment.

5. The herein-described process of making a confection consisting in roasting cocoa-beans, removing the shells, grinding and boiling with water until the starch-grains are broken, adding malt extract, and digesting until the starch is converted into malt sugar, emulsifying the butter of the cocoa-beans with the other elements by boiling the mixture down and rapidly stirring, adding a diastatic ferment, evaporating, stirring, and adding sugar.

6. The herein-described process of making a confection consisting in roasting in the proportion of one hundred pounds of cocoa-beans, crushing them and removing the shells, grinding and boiling with two hundred pounds of water until all the starch-grains are broken, adding fifty pounds of malt extract, digesting at 170° Fahrenheit until the starch is converted into malt sugar, boiling down and stirring until the butter of the cocoa is emulsified throughout the mixture, adding a diastatic ferment and sugar.

Signed at New York, in the county of New York and State of New York, this 29th day of August, A. D. 1902.

CHARLES HENRY BURCKETT.
MARY MARTIN BURCKETT.

Witnesses:
  H. W. PACKARD,
  A. J. SCHRODER.